(12) United States Patent
Cheung et al.

(10) Patent No.: US 8,856,815 B2
(45) Date of Patent: Oct. 7, 2014

(54) SELECTIVE ADJUSTMENT OF PICTURE QUALITY FEATURES OF A DISPLAY

(75) Inventors: Kin-Hang Cheung, San Jose, CA (US); Qing Li, Fremont, CA (US); Szu-Wei Lee, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/457,811

(22) Filed: Apr. 27, 2012

(65) Prior Publication Data

US 2013/0290993 A1   Oct. 31, 2013

(51) Int. Cl.
*H04H 60/56* (2008.01)

(52) U.S. Cl.
USPC ................................. 725/12; 725/10

(58) Field of Classification Search
None
See application file for complete search history.

(56) References Cited

U.S. PATENT DOCUMENTS

| | | | |
|---|---|---|---|
| 7,177,448 B1 * | 2/2007 | Sah | 382/107 |
| 2004/0183749 A1 * | 9/2004 | Vertegaal | 345/7 |
| 2006/0203917 A1 * | 9/2006 | Uchida et al. | 375/240.24 |
| 2007/0061851 A1 * | 3/2007 | Deshpande et al. | 725/88 |
| 2007/0061862 A1 * | 3/2007 | Berger et al. | 725/139 |
| 2008/0285660 A1 * | 11/2008 | Raines et al. | 375/240.25 |
| 2011/0093605 A1 * | 4/2011 | Choudhury et al. | 709/231 |

FOREIGN PATENT DOCUMENTS

EP    1843592 A1 * 10/2007

* cited by examiner

*Primary Examiner* — Chenea Smith
(74) *Attorney, Agent, or Firm* — Lynch Law Patent Group, P.C.

(57) ABSTRACT

Systems, apparatus, articles, and methods are described including operations for selectively adjusting picture quality features of a display based at least in part on whether a user can perceive a loss in video quality and/or on power supply data.

2 Claims, 6 Drawing Sheets

SELECTIVE ADJUSTMENT OF PICTURE QUALITY FEATURES OF A DISPLAY

BACKGROUND

Personal computer users today often open and interact with multiple applications at the same time. Media player-type applications are one of the most common applications. In a window user interface environment, the media playback window may be completely or partially obscured by other window(s) and/or minimized. In cases where the content is not visible to the users (e.g., where the media playback window may be completely or partially obscured by other window(s)), the media player software may continue to run to ensure good user experience (smooth playback) when the playback window becomes visible in the foreground. Likewise, in cases where the media playback window is of such a size to limit the ability of a user to perceive a lowered picture quality (e.g., where the media playback window may be minimized), the media player software may continue to run to ensure good user experience (smooth playback) when the playback window becomes enlarged. Accordingly, media player-type applications typically continue to request graphics processing unit (GPU) hardware to perform decode processing and/or video processing at typical user preferred quality settings.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
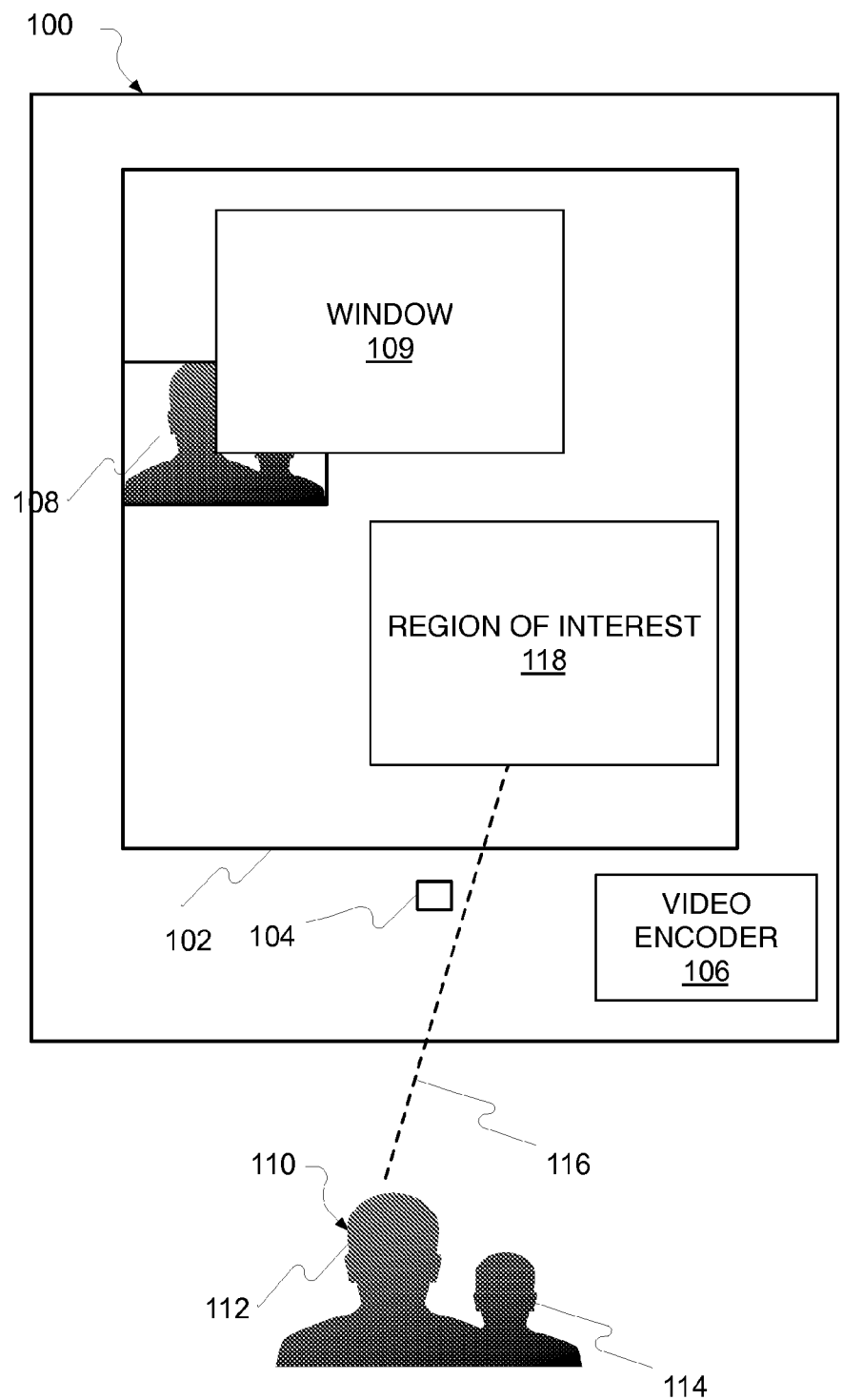
FIG. 1 is an illustrative diagram of an example picture quality system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for selectively adjusting picture quality features of a display based at least in part on whether a user can perceive a loss in video quality and/or on power supply data.

As described above, in some cases, in a window user interface environment, the media playback window of media player-type applications may be completely or partially obscured by other window(s) and/or minimized. In such cases, media player-type applications typically continue to request graphics processing unit (GPU) hardware to perform decode processing and/or video processing at typical user preferred quality settings. Such decode processing and/or video processing may not be very power efficient given that a lower video quality may not be able to be perceived by a user. In some situations, users might manually pause the playback; however, there may be no automated solution to conserve power when the playback remains active.

As will be described in greater detail below, operations for selectively adjusting picture quality features may be implemented based at least in part on determining whether a user can perceive a loss in video quality and/or on power supply data. For example, in cases where a video playback window is fully obscured, minimized, or shrunk to thumbnail size (e.g.

320×180), or not being viewed by the end users, the video content may not be consumed. Accordingly, a drop in video quality may not be perceived by the end users. When the media player-type applications detect any one of these conditions, power consumption might be reduced by pausing the playback automatically. Additionally or alternatively, the media player-type applications may request a graphics driver to reduce power consumption by disabling picture quality features in decode processing and/or post-processing stages.

FIG. 1 is an illustrative diagram of an example picture quality system 100, arranged in accordance with at least some implementations of the present disclosure. In the illustrated implementation, picture quality system 100 may include a display 102, an imaging device 104, and a video encoder 106. In some examples, picture quality system 100 may include additional items that have not been shown in FIG. 1 for the sake of clarity. For example, picture quality system 100 may include a processor, a radio frequency-type (RF) transceiver, and/or an antenna. Further, picture quality system 100 may include additional items such as a speaker, a microphone, an accelerometer, memory, a router, network interface logic, etc. that have not been shown in FIG. 1 for the sake of clarity.

In some examples, such picture quality adjustment may include selectively adjusting picture quality of a video 108 being presented on display 102 between a basic picture quality and an enhanced picture quality. Such a change in picture quality may be based at least in part on a determination of whether the user can perceive a loss in video quality and/or based at least in part on received power supply data. The basic picture quality may be associated with a different lower picture quality as compared with the enhanced picture quality. For example, a basic picture quality may be selected in cases where the user cannot perceive a loss in video quality and/or in cases where the power supply data indicates battery power is being used or is limited.

As used herein, the term "enhanced picture quality" may refer to one or more of the following picture quality techniques: decoding B-picture-type non-reference pictures, performing in-loop deblocking during decoding, performing denoise and color enhancement features, utilizing an enhanced deinterlace algorithm, utilizing an enhanced frame rate conversion algorithm, the like, and/or combinations thereof Conversely, as used herein, the term "basic picture quality" may refer to one or more of the following picture quality techniques: skipping decoding B-picture-type non-reference pictures, disabling in-loop deblocking during decoding, disabling denoise and color enhancement features, utilizing a basic deinterlace algorithm that is associated with a different lower picture quality as compared with the enhanced deinterlace algorithm, and utilizing a basic frame rate conversion algorithm that is associated with a different lower picture quality as compared with the enhanced frame rate conversion algorithm, the like, and/or combinations thereof.

For example, power tracking may be utilized by picture quality system 100. For example, such power tracking may involve monitoring power supply data, wherein the power supply data may include an indication of a current power source and/or an indication of battery charge level. Such an indication of the current power source may indicate whether the current power source is a battery-type power source or an external power source. Accordingly, picture quality system 100 may be capable of performing selective application of various picture quality levels by being power aware. In one example, picture quality system 100 may be aware of whether the current power source is a battery-type power source or an external power source and/or aware of the battery charge level. In cases where the current power source is an external power source, picture quality system 100 may apply an enhanced picture quality. Conversely, in cases where the current power source is a battery-type power source and the battery charge level is low, picture quality system 100 may apply a base picture quality.

In some implementations, such a determination of whether the user can perceive a loss in video quality may be based at least in part on facial detection techniques, eye tracking techniques, window layout, the like, and/or combinations thereof. For example, the determination of whether the user can perceive a loss in video quality may be based at least in part on a detection of absence of a user's presence via facial detection, detection of absence of a user's eye gaze, detection of a window layout, the like, and/or combinations thereof. Facial detection may be performed for at least one of the one or more users based at least in part on the received visual data from image device 104. Eye tracking may be performed for at least one of the one or more users based at least in part on the received visual data from image device 104. A windows manager (not shown) may provide window layout information that may indicate a screen size reduction of a window 108 playing the video and/or indicating obscuring (e.g., via window 109) of window 108 playing the video.

In some implementations, the determination of whether the user can perceive a loss in video quality may be based at least in part on a detection of a window layout. For example, window 108 playing the video may have a reduced screen size. Such a reduced screen size may make a user unable to perceive a loss in video quality. Additionally or alternatively, window 108 playing the video may be completely or partially obscured (e.g., via window 109). Such an obscuring of window 108 playing the video may make a user unable to perceive a loss in video quality. Accordingly, picture quality system 100 may be capable of selectively adjusting picture quality to the basic picture quality in response to a determination of a screen size reduction of window 108 playing the video and/or a determination of obscuring (e.g., via window 109) of window 108 playing the video.

Imaging device 104 may be configured to capture visual data from one or more users 110 of picture quality system 100. For example, imaging device 104 may be configured to capture visual data from a first user 112, a second user 114, from one or more additional users, the like, and/or combinations thereof In some examples, imaging device 104 may be located on picture quality system 100 so as to be capable of viewing users 110 while users 110 are viewing display 102.

In some examples, visual data of the first user may be captured via a camera sensor-type imaging device 104 or the like (e.g., a complementary metal-oxide-semiconductor-type image sensor (CMOS) or a charge-coupled device-type image sensor (CCD)), without the use of a red-green-blue (RGB) depth camera and/or microphone-array to locate who is speaking. In other examples, an RGB-Depth camera and/or microphone-array might be used in addition to or in the alternative to the camera sensor. In some examples, imaging device 104 may be provided via either a peripheral eye tracking camera or as an integrated eye tracking camera in picture quality system 100.

In some implementations, facial detection may be performed, for at least one of one or more users 110, based at least in part on the received visual data. A target user 112 may be identified based at least in part on the performed facial detection. Accordingly, picture quality system 100 may be capable of selectively adjusting picture quality to the basic picture quality in response to an indication that target user 112 is not present based at least in part on the performed facial detection.

In some implementations, eye tracking may be performed, for at least one of one or more users 110, based at least in part on the received visual data. A region of interest 118 on display 102 may be determined based at least in part on performing eye tracking for target user 112. The region of interest 118 may either indicate that target user's 112 eyes are on window 108 playing the video or may indicate that target user's 112 eyes are not on window 108 playing the video or on display 102. Accordingly, picture quality system 100 may be capable of selectively adjusting picture quality to the basic picture quality in response to an indication that target user's 112 eyes are not on window 108 playing the video or on display 102.

In some examples, such eye tracking may include tracking fixations and/or gazes. As used herein the term "gaze" may refer to a fleeting glance while the term "fixation" may refer to a sustained glance maintained for a time period longer than for that of a gaze. Fixations may refer to observations of a certain point in the visual field. This input, spanning about two degrees of the visual field, may be processed with sharpness, clarity and accuracy. There are typically about three to four fixations per second, with a duration of about two hundred to three hundred milliseconds each. For example, fixation may include several closely grouped gaze points, where such gazes may typically have a duration of about seventeen milliseconds. Saccades may refer to a relocation of the point of fixation. Saccades may be fast ballistic movements (e.g., the target is decided before initiation) between a first fixation and a second fixation. Saccades typically have an amplitude of up to about twenty degrees and a duration of about forty milliseconds (during which there is a suppression of the visual stimulus). Fixations and/or saccades 116 may be utilized for gathering and integrating visual information. Fixations and/or saccades may also reflect the intentions and cognitive states of one or more users 110.

Additionally or alternatively, picture quality system 100 may be configured to automatically pause the video playback. For example, picture quality system 100 may automatically pause the video playback based at least in part on the determination that the user cannot perceive a loss in video quality. Such as, when absence of a user's presence has been detected via facial detection.

As will be discussed in greater detail below, picture quality system 100 may be used to perform some or all of the various functions discussed below in connection with FIGS. 2 and/or 3.

Figure 2:
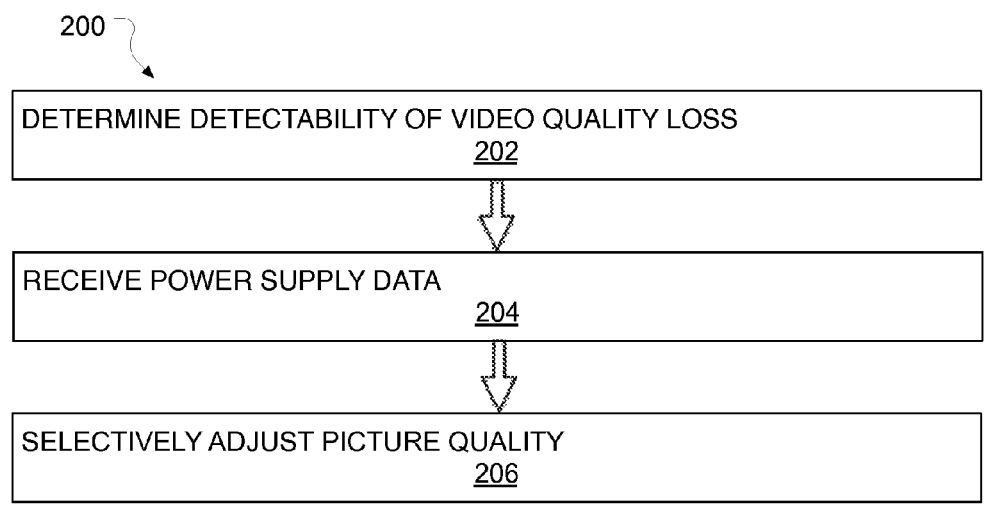
FIG. 2 is a flow chart illustrating an example picture quality process.

FIG. 2 is a flow chart illustrating an example picture quality process 200, arranged in accordance with at least some implementations of the present disclosure. In the illustrated implementation, process 200 may include one or more operations, functions or actions as illustrated by one or more of blocks 202, 204, and/or 206. By way of non-limiting example, process 200 will be described herein with reference to example picture quality system 100 of FIG. 1 and/or 4.

Process 200 may begin at block 202, "DETERMINE DETECTABILITY OF VIDEO QUALITY LOSS", where a determination may be made regarding whether a user can detect video quality loss. For example, a determination may be made regarding whether a user can perceive a loss in video quality of a video being presented on a display.

Processing may continue from operation 202 to operation 204, "RECEIVE POWER SUPPLY DATA", where power supply data may be received. For example, power supply data may be received, where the power supply data may include an indication of a current power source and/or an indication of battery charge level. The indication of the current power source may indicate whether the current power source is a battery-type power source or an external power source.

Processing may continue from operation 204 to operation 206, "SELECTIVELY ADJUST PICTURE QUALITY", where picture quality may be selectively adjusted. For example, picture quality may be selectively adjusted between a basic picture quality and an enhanced picture quality different from the basic picture quality. Such an adjustment of picture quality may be based at least in part on the determination of whether the user can perceive a loss in video quality and/or on the received power supply data. The basic picture quality may be associated with a different lower picture quality as compared with the enhanced picture quality.

In operation, process 200 may utilize smart and context aware responses to power supply data, user visual queues, and/or window layout. For example, process 200 may be capable selectively adjusting picture quality between a basic picture quality and an enhanced picture quality in response to such context.

Some additional and/or alternative details related to process 200 may be illustrated in one or more examples of implementations discussed in greater detail below with regard to FIG. 3.

Figure 3:
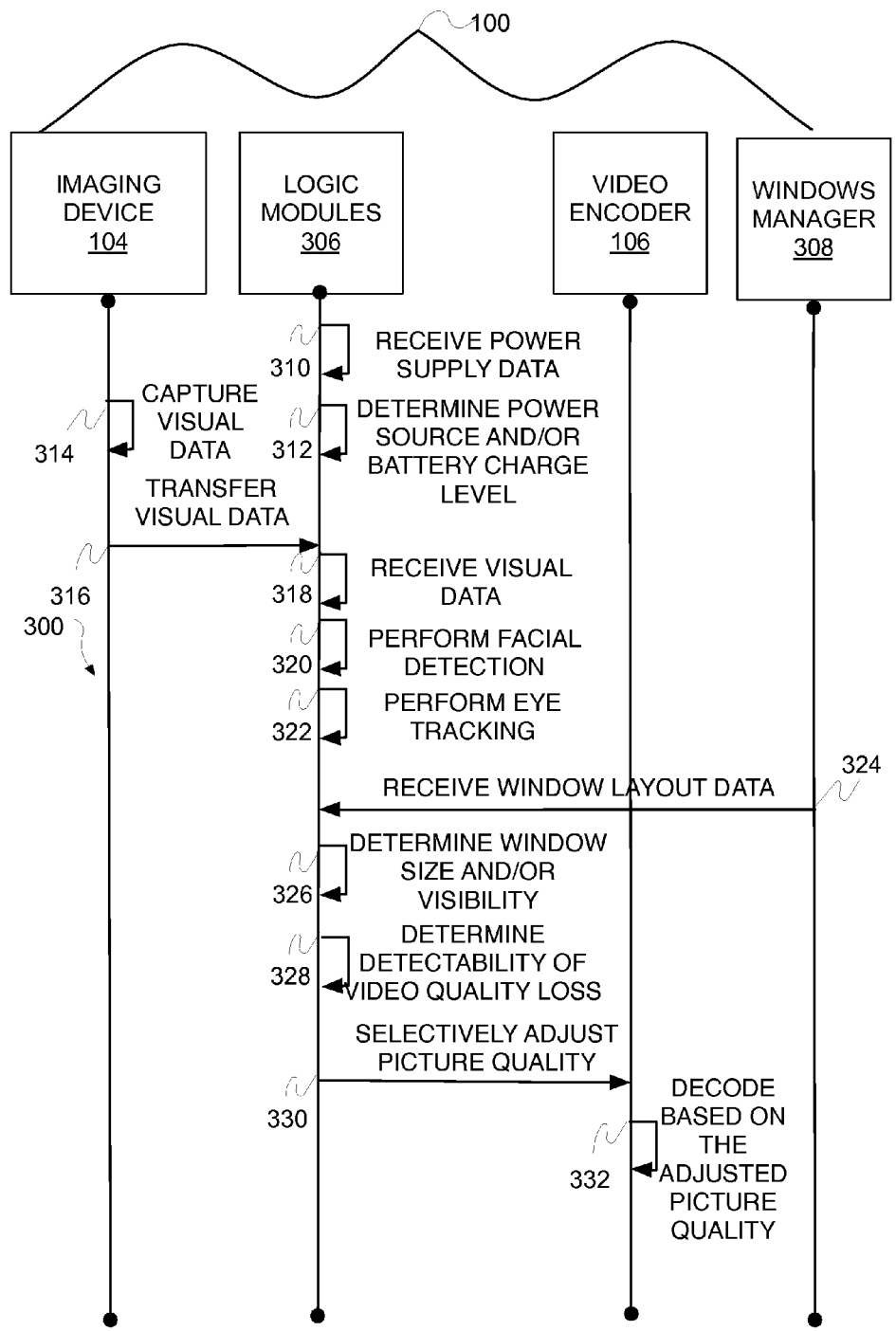
FIG. 3 is an illustrative diagram of an example picture quality system in operation.

FIG. 3 is an illustrative diagram of example picture quality system 100 and picture quality process 300 in operation, arranged in accordance with at least some implementations of the present disclosure. In the illustrated implementation, process 300 may include one or more operations, functions or actions as illustrated by one or more of actions 310, 312, 314, 316, 318, 320, 322, 324, 326, 328, 330, and/or 332. By way of non-limiting example, process 300 will be described herein with reference to example picture quality system 100 of FIG. 1 and/or 4.

In the illustrated implementation, picture quality system 100 may include imaging device 104, video encoder 106, logic modules 306, windows manager 308, the like, and/or combinations thereof. Although picture quality system 100, as shown in FIG. 3, may include one particular set of blocks or actions associated with particular modules, these blocks or actions may be associated with different modules than the particular module illustrated here.

Process 300 may begin at operation 310, "RECEIVE POWER SUPPLY DATA", where power supply data may be received. For example, power supply data may be received, where the power supply data may include an indication of a current power source and/or an indication of battery charge level. The indication of the current power source may indicate whether the current power source is a battery-type power source or an external power source.

For example, capturing of power supply data may be performed in conjunction with a power supply (not shown, such as a battery or the like). The power supply data may include an indication of a current power source and/or an indication of battery charge level.

Processing may continue from operation 310 to operation 312, "DETERMINE POWER SOURCE AND/OR BATTERY CHARGE LEVEL", where power source and/or battery charge level may be determined For example, the power supply data may supply an indication of the current power source (e.g., the power supply data may indicate whether the current power source is a battery-type power source or an external power source. Additionally, the power supply data may supply an indication of the battery charge level.

While process 300 is illustrated as beginning at operations 310 and 312, operations 310 and 312 may occur at any point prior to operation 330, which will be discussed in greater detail below.

Processing may continue from operation 312 to operation 314, "CAPTURE VISUAL DATA", where visual data may be captured. For example, capturing of visual data may be performed via imaging device 104.

Processing may continue from operation 314 to operation 316, "TRANSFER VISUAL DATA", where visual data may be transferred. For example, visual data may be transferred from imaging device 104 to logic modules 306.

Processing may continue from operation 316 to operation 318, "RECEIVE VISUAL DATA", where visual data may be received. For example, the received visual data may include video of one or more users.

Processing may continue from operation 318 to operation 320, "PERFORM FACIAL DETECTION", where facial detection may be performed. For example, facial detection may be performed for at least one of the one or more users based at least in part on the received visual data. In some implementations, the determination of whether the user can perceive a loss in video quality (as discussed below at operation 328) may be based at least in part on the detection of absence of a user's presence via facial detection. For example, the presence or non-presence of a user may be determined where a face of user may be detected or be recognized as not being present based at least in part on the facial detection.

In some examples, such face detection may be configured to differentiate between the one or more users. Such facial detection techniques may allow relative accumulations to include face detection, motion tracking, landmark detection, face alignment, smile/blink/gender/age detection, face recognition, detecting two or more faces, and/or the like.

In some examples, the detection of the face may include detecting the face based at least in part on a Viola-Jones-type framework (see, e.g., Paul Viola, Michael Jones, Rapid Object Detection using a Boosted Cascade of Simple Features, CVPR 2001 and/or PCT/CN2010/000997, by Yangzhou Du, Qiang Li, entitled TECHNIQUES FOR FACE DETECTION AND TRACKING, filed Dec. 10, 2010). Such facial detection techniques may allow relative accumulations to include face detection, landmark detection, face alignment, smile/blink/gender/age detection, face recognition, detecting two or more faces, and/or the like.

Processing may continue from operation 318 and/or 320 to operation 322, "PERFORM EYE TRACKING", where eye tracking may be performed. For example, eye tracking may be performed for at least one of the one or more users based at least in part on the received visual data. In some implementations, the determination of whether the user can perceive a loss in video quality (as discussed below at operation 328) may be based at least in part on a detection of absence of a user's eye gaze from display 102 itself and/or from the video being presented on a window on display 102.

In some implementations, the performance of eye tracking may occur in response to the determination at operation 320 that at least one of the one or more users is present, for at least one of the one or more users.

In some examples, such eye tracking may include tracking fixations and/or gazes. For example, gaze duration on a video window may be determined. For example, such gaze duration may be based on a determination of the proportion of time spent looking at a given video window.

In another example, such eye tracking may include determining the number of fixations on the area of interest for a given time window (e.g., the last minute), in relation to a given video window. For example, such fixations may illustrate the proportion of interest on the area of interest of the video window as compared to other areas in the display area. This metric may indicate the "importance" of the area to the viewer and may be directly related to a gaze rate.

In a further example, such eye tracking may include determining the number of gazes on the area of interest for a given time window. For example, such a determination of the number of gazes may illustrate the proportion of gazes on the area of interest of a video window as compared to other areas in the display area. The number of gazes can be measured as the concatenation of successive fixations within the area of interest and provide an indication of the importance of the video window to a user, and may be used to trigger picture quality adjustment.

In some examples, a determination may be made that the user's eyes are no longer on display 102 and/or on the video being presented on a window on display 102. For example, a determination may be made that the user's eyes are no longer on display 102 and/or on the window playing the video based at least in part on the changes in a users gaze as may be indicated by continuing performed eye tracking. For example, recognition that the user's eyes are no longer on display 102 and/or on the video being presented on a window on display 102 may be determined when the users eyes change to a new fixation.

Processing may continue from operation 322 to operation 324, "RECEIVE WINDOW LAYOUT DATA", where window layout data may be received. For example, window layout data may be received by logic modules 306 from windows manager 308.

Processing may continue from operation 324 to operation 326, "DETERMINE WINDOW SIZE AND/OR VISIBILITY", where window size and/or visibility may be determined. For example, detection of a window layout may include detection of screen size reduction and/or detection of an obscuring of a window playing the video. In some implementations, the determination of whether the user can perceive a loss in video quality (as discussed below at operation 328) may be based at least in part on a detection of the window layout.

For example, a window playing the video may have a reduced screen size. Such a reduced screen size may make a user unable to perceive a loss in video quality. Additionally or alternatively, a window playing the video may be completely or partially obscured (e.g., via another window). Such an obscuring of the window playing the video may make a user unable to perceive a loss in video quality. Accordingly, picture quality system 100 may be capable of selectively adjusting picture quality to the basic picture quality in response to a determination of a screen size reduction of the window playing the video and/or a determination of obscuring (e.g., via another window) of the window playing the video.

While process 300 is illustrated as proceeding from operation 322 to operations 324 and 326, operations 324 and 326 may occur at any point prior to operation 330, which will be discussed in greater detail below.

Processing may continue from operations 320, 322, and/or 326 to operation 328, "DETERMINE DETECTABILITY OF VIDEO QUALITY LOSS", where a determination may be made regarding whether a user can detect video quality loss. For example, a determination may be made regarding whether a user can perceive a loss in video quality of a video being presented on a display.

Processing may continue from operation 328 to operation 330, "SELECTIVELY ADJUST PICTURE QUALITY", where picture quality may be selectively adjusted. For example, picture quality may be selectively adjusted between a basic picture quality and an enhanced picture quality different from the basic picture quality. Such an adjustment of picture quality may be based at least in part on the determination of whether the user can perceive a loss in video quality and/or on the received power supply data. The basic picture quality may be associated with a different lower picture quality as compared with the enhanced picture quality.

In some implementations, selectively adjusting the picture quality may include selectively adjusting the picture quality to the enhanced picture quality in response to an indication that the current power source is an external power source.

In other implementations, selectively adjusting the picture quality may include selectively adjusting the picture quality to the basic picture quality in response to an indication that the current power source is a battery-type power source and/or in response to a determination that the user cannot perceive a loss in video quality.

Processing may continue from operation 330 to operation 332, "DECODE BASED ON THE ADJUSTED PICTURE QUALITY", where the adjusted picture quality may be utilized during decoding. For example, video encoder 106 may decode received video for presentation on the display (not shown) based at least in part on the selectively adjusted picture quality.

Additionally or alternatively, process 300 may be configured to automatically pause the video playback. For example, process 300 may automatically pause the video playback based at least in part on the determination that the user cannot perceive a loss in video quality at operation 330. Such as, when absence of a user's presence has been detected via facial detection. For example, the automatic pause of the playback may be utilized when the end user is not watching or cannot see the video. Automatic pause may be used as a power savings feature and can help end users to pick up from the point where they stops watching the video. But some end users may choose not to pause the playback so they can continue to listen to the audio.

In operation, some aspects of process 300 may be implemented through a device driver interface (DDI). In some examples media driver software might introduce a virtual video driver such as a kernel level driver (e.g., a device driver interface (DDI) as a kernel level driver of Windows™ OS). Such a virtual video driver may be utilized for selectively adjusting the picture quality between a basic picture quality and an enhanced picture quality (e.g., to switch between normal operating and power savings modes). Such a change in picture quality may be based at least in part on a determination of whether the user can perceive a loss in video quality and/or based at least in part on received power supply data. The basic picture quality may be associated with a different lower picture quality as compared with the enhanced picture quality. For example, a basic picture quality may be selected in cases where the user cannot perceive a loss in video quality and/or in cases where the power supply data indicates battery power is being used or is limited. In cases where user could perceive a drop in picture quality the virtual video driver (e.g., DDI) may be invoked to request the driver to go back to a quality mode. In cases where user could not perceive a drop in picture quality the virtual video driver (e.g., DDI) may be invoked to go into a power savings mode.

In some examples, by default, media driver software can operate in enhanced picture quality mode (e.g., a normal operating mode) where all the application requested features may typically be enabled. When media driver software detects conditions when the user cannot perceive quality drop, media driver software can invoke the virtual video driver to tell the driver to save as much power as possible without worrying about quality drop. Upon request, the virtual video driver can disable video features such as: skipping the decode of some non reference pictures (B-pictures), disabling in-loop deblocking (ILDB) in decode, disabling denoise and/or color enhancement features in video processing, using a less compute and memory bandwidth intensive deinterlace algorithm, using a less compute and memory bandwidth intensive frame rate conversion algorithm, the like, and/or combinations thereof In such an example, power savings ranging from tens to hundreds of milliwatts can be realized. Also the virtual video driver may allow the platform specific playback power optimizations to be abstracted from the media driver software. First, the media driver software does not have to implement a complex power management policy. Second, it's not necessary to reveal the optimization techniques to the media software vendors.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
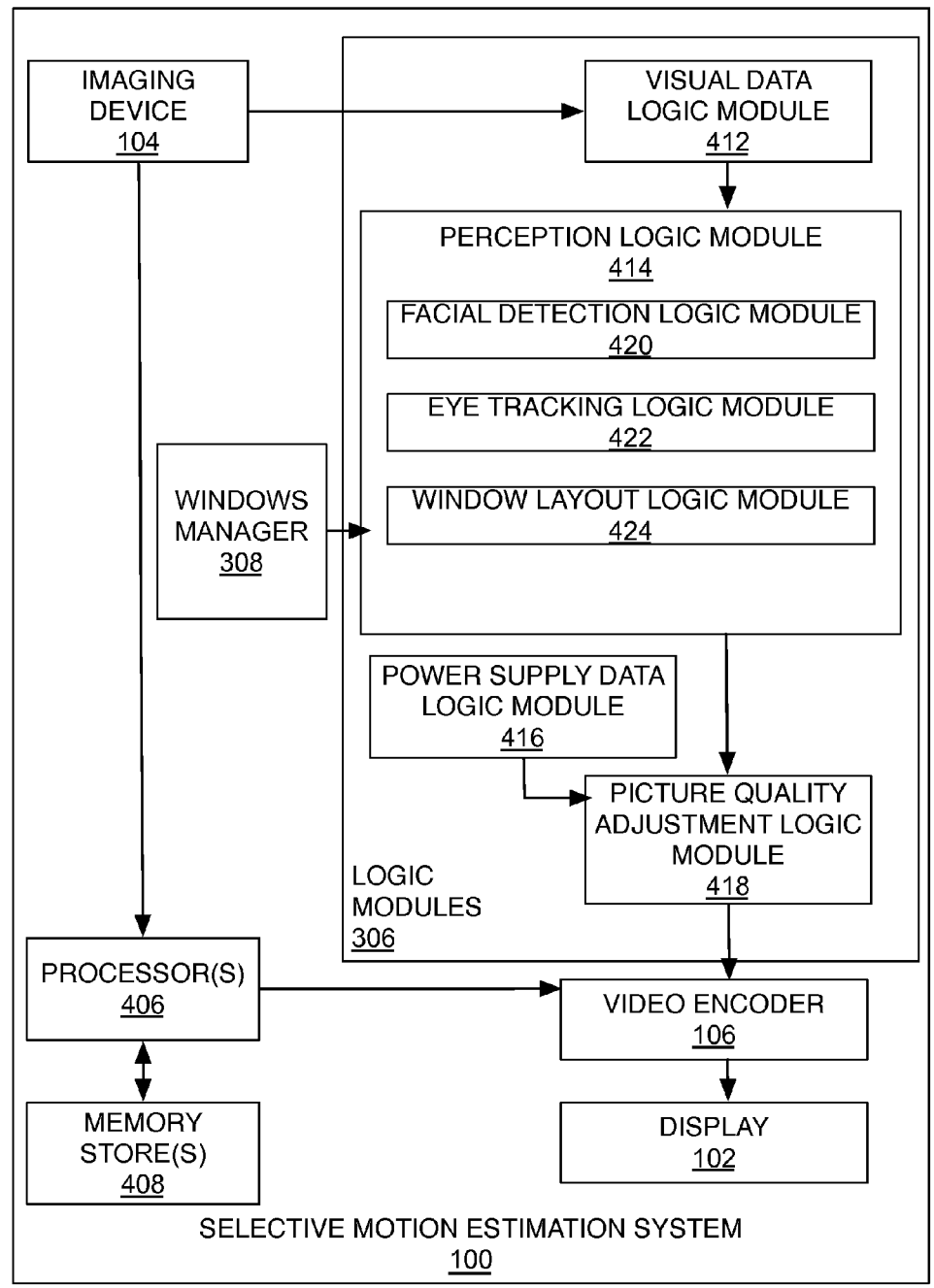
FIG. 4 is an illustrative diagram of an example picture quality system.

FIG. 4 is an illustrative diagram of an example picture quality system 100, arranged in accordance with at least some implementations of the present disclosure. In the illustrated implementation, picture quality system 100 may include display 102, imaging device 104, video encoder 106, logic modules 306, windows manager 308, one or more processors, and/or one or more memory stores 408. Logic modules 306 may include a visual data logic module 412, a perception logic module 414, a power supply logic module 416, a picture quality adjustment logic module 418, the like, and/or combinations thereof As illustrated, display 102, imaging device 104, video encoder 106, windows manager 308, processor 402 and/or memory store 404 may be capable of communication with one another and/or communication with portions of logic modules 306. Although picture quality system 100, as shown in FIG. 4, may include one particular set of blocks or actions associated with particular modules, these blocks or actions may be associated with different modules than the particular module illustrated here.

In some examples, imaging device 104 may be configured to capture visual data. Processors 402 may be communicatively coupled to display 102 and to imaging device 104. Memory stores 404 may be communicatively coupled to processors 402. Visual data logic module 412, perception logic module 414, power supply logic module 416, and/or picture quality adjustment logic module 418 may be communicatively coupled to processors 402 and/or memory stores 404.

In some examples, visual data logic module 412 may be configured to receive visual data, where the visual data may include video of one or more users. Perception logic module 414 may be communicatively coupled to visual data logic module 412 and may be configured to determine whether a user can perceive a loss in video quality of a video being presented on display 102. Power supply logic module 416 may be coupled to a power supply and may be configured to receive power supply data. Picture quality adjustment logic module 418 may be communicatively coupled to perception logic module 414 and power supply logic module 414. Picture quality adjustment logic module 418 may be configured to selectively adjust picture quality between a basic picture quality and an enhanced picture quality based at least in part on the determination of whether the user can perceive a loss in video quality and the received power supply data. The basic picture quality may be associated with a different lower picture quality as compared with the enhanced picture quality.

In some examples, perception logic module 414 further may include a facial detection logic module 420, an eye tracking logic module 422, a window layout logic module 424, the like, and/or combinations thereof. The determination of whether the user can perceive a loss in video quality may be based at least in part on a detection of absence of a user's presence via facial detection, detection of absence of a user's eye gaze, detection of a window layout, the like, and/or combinations thereof. Facial detection logic module may be communicatively coupled to visual data logic module 412 and may be configured to perform facial detection for at least one of the one or more users based at least in part on the received visual data. Eye tracking logic module 422 may be communicatively coupled to visual data logic module 412 and may be configured to perform eye tracking for at least one of the one or more users based at least in part on the received visual data. Window layout logic module 424 may be communicatively coupled to windows manager 308 and may be configured to detect a screen size reduction and/or detect obscuring of a window playing the video.

In various embodiments, picture quality adjustment logic module 418 may be implemented in hardware, while software may implement visual data logic module 412, perception logic module 414, and/or power supply logic module 416. For example, in some embodiments, picture quality adjustment logic module 418 may be implemented by ASIC logic while visual data logic module 412, perception logic module 414, and/or power supply logic module 416 may be provided by software instructions executed by logic such as processors 406. However, the present disclosure is not limited in this regard and visual data logic module 412, perception logic module 414, power supply logic module 416, and/or picture quality adjustment logic module 418 may be implemented by any combination of hardware, firmware and/or software. In addition, memory stores 408 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 408 may be implemented by cache memory.

In operation, some aspects of logic modules 306 may be implemented through a device driver interface (DDI) (not shown). In some examples media driver software might introduce a virtual video driver such as a kernel level driver (e.g., a device driver interface (DDI) as a kernel level driver of WindowsTM OS). Accordingly, in various implementations, device driver interface (DDI) (not shown) may include at least a portion of one or more of logic modules 306 including perception logic module 414, power supply logic module 416, and/or picture quality adjustment logic module 418, the like, and/or combinations thereof. For example, in some embodiments, picture quality adjustment logic module 418 may be implemented as part of device driver interface (DDI) (not shown), while perception logic module 414 might be implemented above DDI in the software stack.

Figure 5:
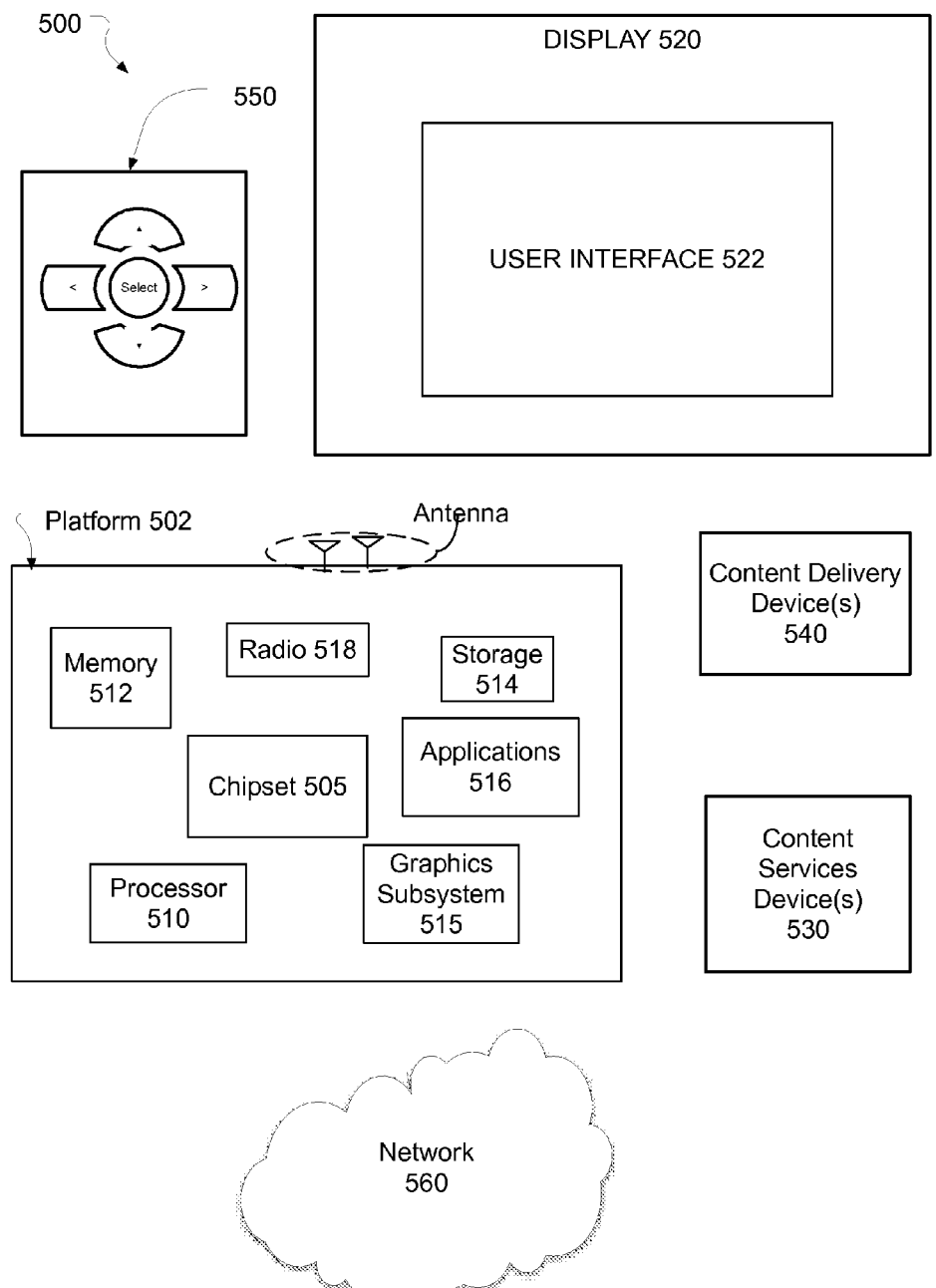
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off" In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
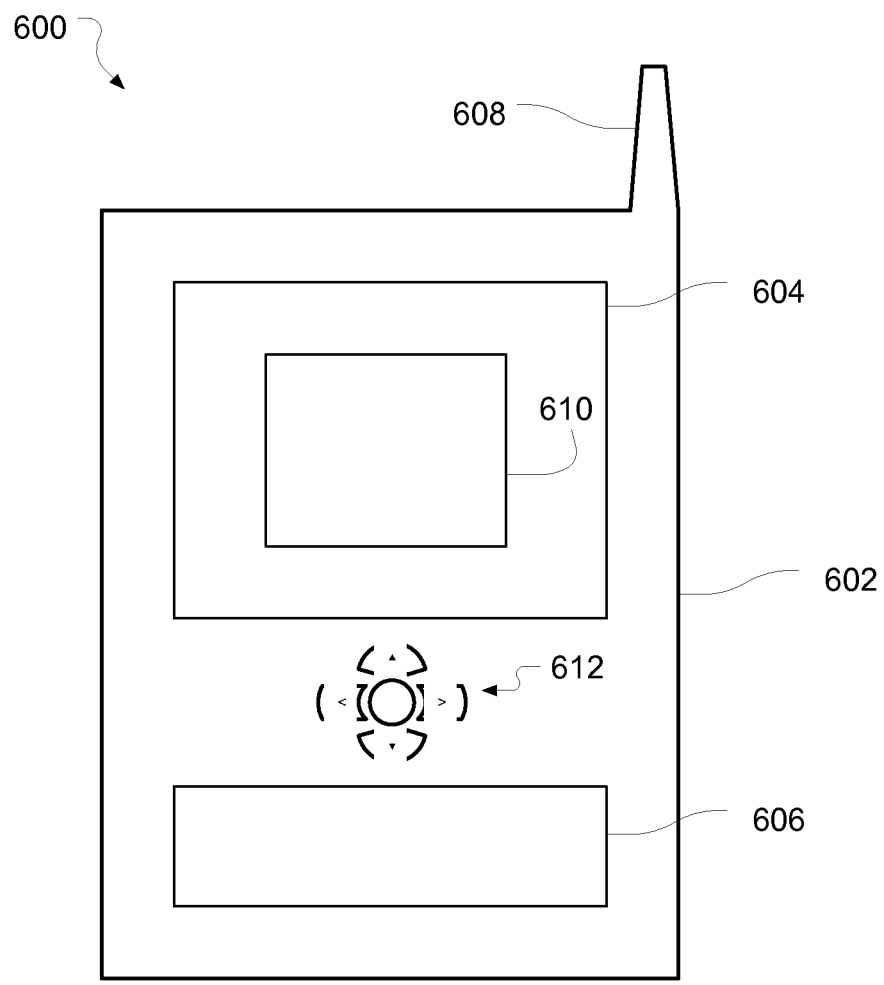
FIG. 6 is an illustrative diagram of an example system, all arranged in accordance with at least some implementations of the present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:
1. A computer-implemented method for selecting picture quality features, comprising:
determining whether a user can perceive a loss in video quality of a video being presented on a window forming less than an entire display comprising:

using face detection to determine if at least one user is facing the display,
using eye tracking to determine whether a user's eyes are directed toward the window on the display,
detecting a window layout comprising:
   determining whether the window has been reduced in size, and
   determining whether the window is obscured;
receiving power supply data; and
selectively adjusting picture quality between a basic picture quality and an enhanced picture quality based at least in part on the determination of whether the user can perceive a loss in video quality and the received power supply data, wherein the basic picture quality is associated with a different lower picture quality as compared with the enhanced picture quality,
wherein the determination of whether the user can perceive a loss in video quality is based at least in part on a detection of absence of a user's presence via facial detection using a Viola-Jones-type technique, the facial detection comprising: receiving visual data of one or more users, and performing facial detection for at least one of the one or more users based at least in part on the received visual data;
wherein the determination of whether the user can perceive a loss in video quality is based at least in part on a detection of absence of a user's eye gaze and fixations, comprising: receiving visual data of one or more users, and performing eye tracking for at least one of the one or more users based at least in part on the received visual data;
wherein the power supply data includes an indication of a current power source and/or an indication of battery charge level, wherein the indication of the current power source indicates whether the current power source is a battery-type power source or an external power source;
wherein the selectively adjusted picture quality comprises selectively adjusting the picture quality to the enhanced picture quality in response to an indication that the current power source is an external power source;
wherein the selectively adjusted picture quality comprises selectively adjusting the picture quality to the basic picture quality in response to an indication that the current power source is a battery-type power source and/or in response to a determination that the user cannot perceive a loss in video quality;
wherein the enhanced picture quality comprises one or more of the following: decoding B-picture-type non-reference pictures, performing in-loop deblocking during decoding, performing denoise and color enhancement features, utilizing an enhanced deinterlace algorithm, utilizing an enhanced frame rate conversion algorithm;
wherein the basic picture quality comprises one or more of the following: skipping decoding B-picture-type non-reference pictures, disabling in-loop deblocking during decoding, disabling denoise and color enhancement features, utilizing a basic deinterlace algorithm that is associated with a different lower picture quality as compared with the enhanced deinterlace algorithm, and utilizing a basic frame rate conversion algorithm that is associated with a different lower picture quality as compared with the enhanced frame rate conversion algorithm; and
further comprising automatically pausing the video playback based at least in part on the determination of whether the user can perceive a loss in video quality based at least in part on a detection of absence of a user's presence via facial detection.

2. A non-transitory article for selecting picture quality features comprising a computer program product having stored therein instructions that, if executed, result in:
determining whether a user can perceive a loss in video quality of a video being presented on a window forming less than an entire display and based at least in part on whether a user's eyes are directed toward the window on the display, comprising:
   using face detection to determine if at least one user is facing the display,
   using eye tracking to determine whether a user's eyes are directed toward the window on the display,
   detecting a window layout comprising:
      determining whether the window has been reduced in size, and
      determining whether the window is obscured;
receiving power supply data; and
selectively adjusting picture quality between a basic picture quality and an enhanced picture quality based at least in part on the determination of whether the user can perceive a loss in video quality and the received power supply data, wherein the basic picture quality is associated with a different lower picture quality as compared with the enhanced picture quality;
wherein the determination of whether the user can perceive a loss in video quality is based at least in part on a detection of absence of a user's presence via facial detection using a Viola-Jones-type technique;
wherein the determination of whether the user can perceive a loss in video quality is based at least in part on a detection of absence of a user's eye gaze and/or fixations;
wherein the power supply data includes an indication of a current power source and/or an indication of battery charge level;
wherein the selectively adjusted picture quality comprises selectively adjusting the picture quality to the enhanced picture quality in response to an indication that the current power source is an external power source;
wherein the enhanced picture quality comprises one or more of the following: decoding B-picture-type non-reference pictures, performing in-loop deblocking during decoding, performing denoise and color enhancement features, utilizing an enhanced deinterlace algorithm, utilizing an enhanced frame rate conversion algorithm; and
the instructions being configured to result in automatically pausing the video playback based at least in part on the determination of whether the user can perceive a loss in video quality.

* * * * *